W. M. RAPE.
Wagon-Brake.
No. 209,291. Patented Oct. 22, 1878.
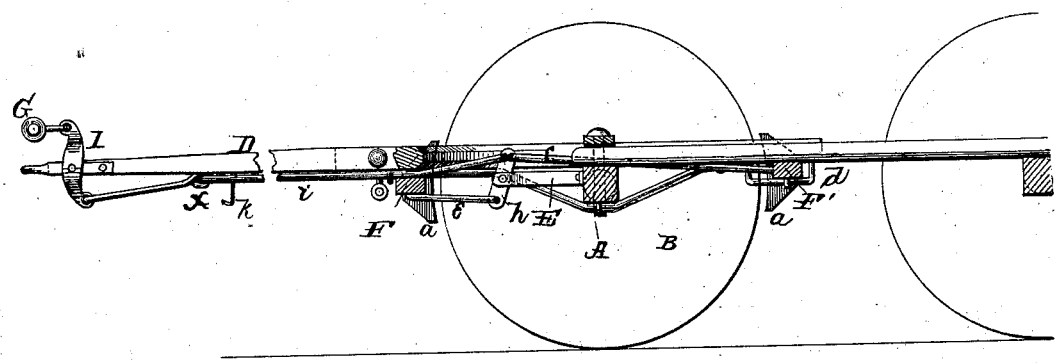
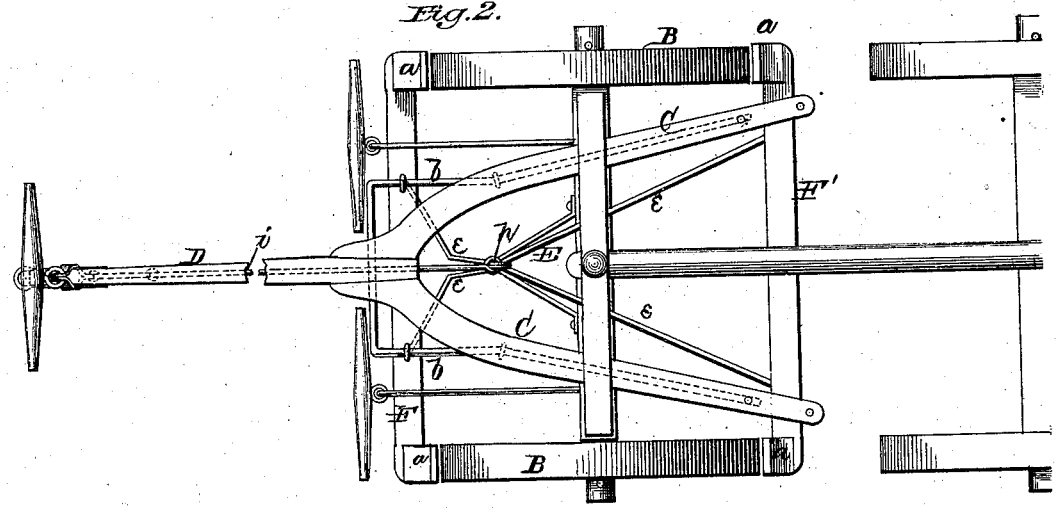

UNITED STATES PATENT OFFICE.

WILLIAM M. RAPE, OF NOTASULGA, ALABAMA.

IMPROVEMENT IN WAGON-BRAKES.

Specification forming part of Letters Patent No. 209,291, dated October 22, 1878; application filed September 12, 1878.

*To all whom it may concern:*

Be it known that I, WILLIAM M. RAPE, of Notasulga, in the county of Macon, and in the State of Alabama, have invented certain new and useful Improvements in Wagon-Brakes; and do hereby declare that the following is a full, clear, and exact description thereof, reference being had to the accompanying drawings, and to the letters of reference marked thereon, making a part of this specification.

The nature of my invention consists in the construction and arrangement of a wagon-brake, to be applied and released by the team, as will be hereinafter more fully set forth.

In order to enable others skilled in the art to which my invention appertains to make and use the same, I will now proceed to describe its construction and operation, referring to the annexed drawing, in which—

Figure 1 is a longitudinal section of the running-gear of a vehicle with my brake applied thereto. Fig. 2 is a plan view of the same.

A represents the front axle of a vehicle, with wheels B B, hounds C C, and tongue or pole D. F F' represent, respectively, front and rear brake-bars, provided with brake-shoes $a$ $a$, for application to the front and rear of the front wheels. The front brake-bar, F, slides upon rods $b$ $b$, while the rear brake-bar, F', slides in staples $d$ $d$ under the rear ends of the hounds C C. The two brake-bars F F' are, by rods $e$ $e$, connected respectively with the lower and upper ends of a lever, $h$, which is pivoted centrally in a frame or brace, E, secured to the front of the axle A. From the upper end of this lever $h$ extends a rod, $i$, forward under the tongue through suitable staples for holding it in place. This rod $i$ is jointed near its forward end, as shown at $x$, and its extreme front end connects with the lower end of a lever, I, which straddles and is pivoted to the front end of the tongue. To the upper end of the lever I the neck-yoke G is connected.

It will readily be seen that in going downhill, and the team holding back, the brakes will be applied through the medium of the levers I and $h$ and their connecting-rods; and as soon as the team commences to pull again the brakes are automatically released. When it is desired to back the vehicle the action of the brake may be stopped by means of a hook, $k$, on the tongue being engaged with the rod $i$ at the joint thereof, when, of course, said rod becomes rigid and will not move.

This brake may be applied equally as well to the hind wheels as to the front wheels, and it may be applied to any vehicle desired.

Having thus fully described my invention, what I claim as new, and desire to secure by Letters Patent, is—

The combination of the brake-bars F F', rods $e$ $e$, hook $k$, lever $h$, jointed rod $i$, lever I, and neck-yoke G, substantially as and for the purposes herein set forth.

In testimony that I claim the foregoing I have hereunto set my hand this 14th day of August, 1878.

WILLIAM M. RAPE.

Witnesses:
ARMISTEAD Y. MOOREFIELD,
THOMAS FOLEY.